3,268,600
DEHALOGENATION OF ORGANIC COMPOUNDS
Richard Jekyll Kingdom, Royston Henry Bennett, and Stamford William Green, Bristol, England, assignors to The National Smelting Company Limited, London, England
No Drawing. Filed May 14, 1963, Ser. No. 280,412
Claims priority, application Great Britain, May 14, 1962, 18,471/62, 18,472/62
8 Claims. (Cl. 260—650)

This invention relates to the dehalogenation of fluorine-containing highly halogenated organic compounds to give fluorinated unsaturated organic compounds.

The process may be applied to the dehalogenation of aliphatic compounds, but it is of particular value for the production of highly fluorinated aromatic compounds such as hexafluorobenzene, pentafluorobenzene, chloropentafluorobenzene and octafluoronaphthalene by the defluorination, dechlorination or dechlorofluorination of appropriate highly halogenated cyclic alkanes, alkenes or alkadienes containing rings of six carbon atoms.

The invention consists in a process for the preparation of a highly fluorinated aromatic, or olefinically unsaturated, organic compound in which a fluorine-containing highly halogenated organic compound is dehalogenated in the vapour phase by contact with at least one metallic oxide at a temperature above 200° C.

A range of oxides may be used and various factors have to be taken into account.

For the purposes of this invention oxides may be considered in two categories, fixed valence oxides and variable valency oxides.

The first group, fixed valence oxides, are useful for defluorination (e.g. for reactions starting with a perfluoro saturated compound). The fluoride which is abstracted from the organic compounds forms metal fluoride and the driving force behind the defluorination reaction appears to be the free energy change metal oxide/metal fluoride. When using such an oxide care should be taken that degradation of the starting material does not take place in addition to defluorination, especially when an oxide of a more electro positive metal, such as magnesium oxide, is used. It should also be noted that the carbon dioxide produced by such degradation may be taken up by the oxide especially when a basic oxide is used.

The second group, variable valence oxides, which are useful for dehalogenation in general, may be further subdivided into three divisions on the basis of their reducing or oxidising power.

(i) Oxides which are good reducing agents act primarily to abstract halogen atoms, thereby raising the metal from a lower to a higher valence state. Little or no carbon dioxide is produced. As higher valence compounds increase in concentration in the oxide body, other reactions may occur. Although strongly reducing oxides such as stannous oxide are preferred for efficient dehalogenation (e.g. where very valuable compounds are being used) they are more difficult to regenerate; regeneration of the oxide is an important preferred feature of the invention and is discussed in more detail below.

(ii) With oxides which are oxidising agents (e.g. manganese dioxide) the initial reaction is to oxidise the organic compounds to carbon dioxide. Dehalogenation only takes place when lower valence compounds have been formed from the higher valence oxide. If such oxides are used for dehalogenation some loss of organic compounds will occur.

(iii) With oxides intermediate in oxidising and reducing power (such as magnetite $Fe_3O_4$) both dehalogenation and carbon dioxide formation can occur together. The equations expressing the reaction of magnetite in the method of this invention are as follows:

(a) $3Fe_3O_4 + C_6F_8 \rightarrow FeF_2 + 4Fe_2O_3 + C_6F_6$
(b) $2FeF_2 + C_6F_8 \rightarrow FeF_3 + C_6F_6$
(c) $20Fe_2O_3 + C_6F_8 \rightarrow 4FeF_2 + 6CO_2 + 12Fe_3O_4$ Oxides in this group have reduced lower valences available and a relatively high free energy change per gram atom of fluorine on conversion of the oxide into the fluoride. They can also be regenerated relatively easily compared with the strongly reducing oxides. Certain oxides in this division do not have reducing lower valences available and tend to behave more like fixed valence oxides especially for more difficult defluorinations.

The invention further consists in a process for the preparation of a perfluorinated aromatic compound in which a highly fluorinated cyclic alkane or alkene containing one or more rings of six carbon atoms in dehalogenated in the vapour phase by contact with an oxide of a metal which has a reducing lower valence state. Thus, a perfluoroaromatic compound may be produced from a saturated or unsaturated fully fluorinated alicyclic fluorocarbon, such as perfluorocyclohexane, perfluorocyclohexene or perfluorodecalin. Alternatively, at least one perfluoroalkyl group may be attached to at least one of the rings of six carbon atoms—i.e. perfluoromethylcyclohexane, perfluoroethylcyclohexane or the three perfluorodimethylcyclohexanes may be used as starting materials. (With saturated starting materials defluorination proceeds more rapidly and in higher conversions if the ring is substituted by one or more of such perfluoroalkyl groups.) Preferred oxides in this form of the invention are magnetite, ferric oxide and chromic oxide, and a preferred temperature range for dehalogenation from 300° C. to 600° C.

In a further form of the invention, perfluorostyrene may be prepared by defluorination of perfluoroethylbenzene at a temperature between 400° C. and 550° C. in the vapour phase by contact with magnetite and/or ferric oxide.

The invention still further consists in a process for the preparation of fluorinated aromatic compounds in which a perchlorofluorocyclic alkane, or perchlorofluorocyclic alkene in which some chlorine atoms are not attached to the carbon atoms at the double bonds, containing one or more rings of six carbon atoms, is dehalogenated in the vapour phase by contacting it with a metal oxide of variable valence at a temperature above 200° C.

In this form of the invention chlorofluorocarbon starting materials, when treated by the process of this invention, tend to eliminate chlorine preferentially; in general, the aromatisation reaction proceeds more rapidly and in higher conversions as the number of chlorine atoms in the molecule increases, the oxide may be used in a reducing lower valence state. More particularly, the chlorofluorocyclic compound to be dehalogenated may be a chlorofluorocyclohexane, such as one of chloroundecafluorocyclohexane, dichlorodecafluorocyclohexanes, trichlorononafluorocyclohexanes, tetrachlorooctafluorocyclohexanes, pentachloroheptafluorocyclohexanes and hexachlorohexafluorocyclohexanes, all containing not more than one chlorine atom attached to any one carbon atom.

It is preferred, in this form of the invention, to use an oxide of a metal in the group, copper, tin, vanadium, molybdenum, tungsten, iron and chromium, preferably magnetite and/or ferric oxide, and to work at between 300° C. and 600° C.

The invention still further consists in a process for the preparation of fluorinated aromatic compounds in which a highly fluorinated cyclohexadiene containing one or two hydrogen atoms attached to olefinic carbon atoms, or a perfluorocyclohexadiene, is dehalogenated in the vapour phase by contact with a metal oxide, which is less basic than calcium oxide, at a temperature above 200° C.

These preferred hydrofluorocarbons contain vinylic hydrogen atoms; other hydrofluorocarbons may undergo de hydrofluorination concurrently with defluorination. Thus 1H and 2H heptafluorocyclohexa-1:3-diene and 1H heptafluorocyclohexa-1:4-diene readily defluorinate and are the preferred starting materials for the production of pentafluorobenzene. With unsaturated starting materials defluorination proceeds more rapidly and completely as the degree of unsaturation increases. For example, decafluorocyclohexene is more easily defluorinated than dodecafluorocyclohexane and the octafluorocyclohexa-1:3 and 1:4 dienes are readily defluorinated in good yield and are the preferred fluorocarbon starting material for the production of hexafluorobenzene.

The oxide may be of a metal with more than one stable valence, e.g. an oxide of a metal in the group tin, vanadium, molybdenum, iron, chromium, titanium, manganese, cobalt, lead, cerium and antimony. Magnetite and/or ferric oxide are especially preferred and the reaction may be carried out between 300° C. and 500° C.

In yet a further form of the invention highly fluorinated aliphatic olefins may be prepared by dechlorination of the corresponding chlorofluorocarbon or chlorofluorohydrocarbon using magnetite at above 200° C. Suitable starting materials are 1,1,2 - trichlorotrifluoroethane or 1,2 - dichloro 1,1,2-trifluoroethane, and dechlorination of these may be carried out at between 300° C. and 500° C.

Whichever form of the invention is followed the process may be carried out by passing the compound to be dehalogenated over a bed of the metal oxide, which may be in the form of powder or aggregated.

A preferred feature is that it is possible to regenerate the oxide used; this is clearly important to the economies of the process, since during the course of the dehalogenation reaction, the metal oxide is converted partly or wholly to the metal chloride, fluoride or mixtures of these thereby reducing its activity for the dehalogenation process.

Thus, the invention still further consists in a process for preparing a fluorinated and olefinically unsaturated organic compound as described above, in combination with subsequent or simultaneous regeneration of the oxide using steam. A reducing gas, such as carbon monoxide or hydrogen, may be present or follow the steam. Alternatively, if hydrogen or a hydrogen yielding gas is used, it may be contacted with the oxide prior to the steam regeneration. Steam regeneration may be carried out at between 200° C. and 700° C., preferably between 400° C.–450° C.

The invention still further consists in a fluorinated and olefinically unsaturated organic compound whenever prepared by the process described above.

The process according to the invention is an alternative to methods for dehalogenation in which the highly halogenated organic compound is passed over heated metal surfaces. It has the advantage that because of the high activity of the preferred metal oxides, as dehalogenation agents the process can be carried out at low temperatures and/or small contact times. Furthermore, a greater quantity of material can be dehalogenated in a reactor of a given size without regeneration being required. It was found when using a reactor packed with 7/32" diameter pellets of magnetite for defluorinating a mixture of the two octofluorocyclohexadienes, that it was possible to convert a large amount of the oxide bed to ferric fluoride before loss of activity made regeneration necessary. A further advantage is that crude mixtures may be dehalogenated with less carbonisation than occurs when metals are used, and that the carbon may be more conveniently removed from the oxide than from a metal surface. Other advantages will be obvious to those skilled in the art.

The fluorinated aromatic compounds which may be prepared by the method of the invention are useful heat- and nuclear-radiation-stable liquids which may thus be used as specialised and robust coolants heat exchange fluids in, e.g. nuclear reactor technology. The olefinic compounds prepared, e.g. tetrafluoroethylene or perfluorostyrene can also be used to make heat- and nuclear-radiation-stable polymers.

The invention will be further described with reference to the accompanying examples which are not intended to limit the scope of the process over that defined in the appended claims.

In Examples 1–4 (Table 1), the quantity of organic compound used was measured by means of a specially constructed micropipette and inpected via a serum cap into a small heated and evacuated glass reactor of 3 ml. capacity. The reactor was held between 330° C and 340° C. and contained 4 g. of magnetite granules of −16 +36 B.S.S. mesh, previously outgassed by heating in nitrogen at 650° C. and in vacuo at 500° C. both for several hours. After residing in the reactor for a time of contact of 4±½ minutes, the organic material was flushed into a gas chromatography column and analysed quantitatively by measuring peak areas and using previously obtained calibrations.

Table 1

| Example | Starting material | Wt. in (mg.) | Wt. out (mg.) | | | | | | |
|---|---|---|---|---|---|---|---|---|---|
| | | | $C_6F_{10}$ | $C_6F_6$ | $C_6F_5H$ | $C_6F_5Cl$ | Unknown | $CO_2$ | Total |
| 1 | $C_6F_{11}Cl$, 45% w./w., $C_6F_{10}Cl_2$, 49% w./w., unknown cpds. 6% w./w. | 30.6 | 4.4 | 4.2 | 0.2 | 2.5 | 0.4 | 0.7 | 12.4 |
| 2 | $C_6F_{10}Cl_2$ | 30.6 | 2.2 | 5.5 | 0.8 | 1.7 | 0.7 | 0.6 | 11.5 |
| 3 | $C_6F_9Cl_3$ | 19.4 | | 6.0 | 0.4 | 1.0 | 0.1 | 0.3 | 7.8 |
| 4 | $C_6F_8Cl_4$ | 30.6 | | 6.7 | 0.1 | 1.8 | | 0.2 | 8.8 |

In Examples 5–15 (Table 2), the oxides were pelleted without the use of any binder, either by extrusion while wet or by compression. The pellets were packed into glass reactors and mixtures of pure octafluoro-1:3 and 1:4-dienes pased over as vapor entrained in a slow flow of nitrogen. The products were collected in cold traps and analysed by gas-liquid chromatography and infra-red spectroscopy.

g. of pentafluorobenzene, 15 g. of carbon dioxide and 1 g. of unreacted octafluorocyclohexadienes. When allowance was made for the amount of defluorination carried out in the preliminary low temperature runs, 250 g. of the octafluorocyclohexadiene mixture could be defluorinated in good yield by 100 g. of magnetite. The small amount of pentafluorobenzene produced is believed to be formed from water or hydroxyl groups in the magnetite.

Table 2

| Example | Oxide | Pellet Col. (ml.) | Organics Wt. in (g.) | Percent 1:3 Diene | Temp., °C. | Contact Time (min.) | Wt. of products (g.) | | | | | |
|---|---|---|---|---|---|---|---|---|---|---|---|---|
| | | | | | | | $C_6F_6$ | $C_6F_5H$ | 1:3+ 1:4 $C_6F_8$ | $CO_2$ | Unknown | Total |
| 5 | $Mn_3O_4$ | 245 | 5.70 | 75 | 300 | 10½ | 2.42 | 0.02 | 1.84 | 0.72 | | 5.00 |
| 6 | $SnO$ | 500 | 9.00 | 75 | 260 | 16 | 5.39 | 0.24 | 1.29 | 0.18 | | 7.10 |
| 7 | $V_2O_3$ | 65 | 3.00 | 60 | 310 | 5 | 0.60 | | 2.01 | 0.39 | | 3.0 |
| 8 | $Fe_2O_3$ | 500 | 13.70 | 80 | 430 | 8 | 0.1 | | | 11.7 | | 11.8 |
| 9 | $Fe_2O_3$ | 500 | 14.80 | 75 | 330 | 8 | 9.84 | 0.25 | 0.30 | 2.01 | | 12.4 |
| 10 | $MoO_3$ | 100 | 5.75 | 60 | 400 | 3 | 0.75 | 0.03 | 3.59 | 0.83 | | 5.20 |
| 11 | $MgO$ | 500 | 7.90 | 60 | 300 | 3 | 0.92 | | 5.32 | | | 6.29 |
| 12 | $Co_3O_4$ | 300 | 8.30 | 67 | 450 | 7 | 3.67 | 0.25 | | 3.90 | | 7.80 |
| 13 | $Cr_2O_3$ | 250 | 6.55 | 67 | 500 | 7½ | 3.34 | 0.18 | 0.57 | 0.84 | | 5.04 |
| 14 | $ZnO$ | 400 | 6.05 | 46 | 400 | 12 | 1.52 | 0.03 | 1.81 | 0.20 | 0.04 | 3.60 |
| 15 | $WO_3$ | 190 | 6.8 | 46 | 500 | 9.7 | 3.4 | 1.1 | | 1.1 | | 5.6 |

NOTES: (1) Examples 8 and 9 represent consecutive runs on an unused bed of ferric oxide pellets prepared from precipitated ferric oxide. Temperatures are approximate only because of the strongly exothermic nature of the process. (2) In example 11 the carbon dioxide figure is not given as $CO_2$ was partially retained by the MgO. (3) In Example 13, some silicon tetrafluoride was produced. This is not included in the product weight.

*Example 16.*—Magnetite pellets were prepared by the reduction of ferric oxide pellets with a mixture of 20% v./v. of carbon monoxide in carbon dioxide at 500° C. After some preliminary experiments in which a mixture of pure octafluorocyclohexa 1:3 and 1:4 dienes were passed over in a nitrogen stream at temperatures between 260° and 310° C., 100 g. of the pellets (125 mls.) were packed into a small copper reactor. A mixture of pure octafluorocyclohexadienes containing 31.5% of the 1:3 isomer was passed over in a nitrogen stream at a temperature between 445° C. and 455° C. with a contact time between 3½ minutes and 5 minutes. The products were collected in cold traps and analysed by gas liquid chromatography. A series of experiments were carried out under these conditions until the magnetite had shown a reduction in activity and significant quantities of unchanged octafluorocyclohexadienes were produced. Altogether 229 g. of the diene mixture was defluorinated to give a total product consisting of 164 g. of hexafluorobenzene, 4

*Example 17.*—80 g. of a commercially available magnetite was pelleted to give 50 mls. of 7/32″ diameter pellets which were packed into a small copper reactor. After a series of defluorination runs using a crude mixture consisting mainly of fluorinated cyclohexadienes, some slight loss in activity was apparent and regeneration was effected by passing a mixture of steam (300 g.) and nitrogen over for 5½ hours at 430° C.–450° C., after which time no more hydrogen fluoride was evolved. An X-ray diffraction analysis of the pellets showed them to consist of ferric oxide and magnetite in roughly equal amounts, and no iron fluorides were detected. Further quantities of the same crude mixture were then passed over the regenerated pellets. The results obtained showed that the pellets had regained their original activity.

In Examples 18–25 (Table 3) the experiments were carried out substantially as described in Examples 5–14 above.

Table 3

| Example No. | Oxide and Vol. Used (mls.) | Compound Dehalogenated | Wt. in (g.) | Temp., °C. | Contact Time (mins.) | Wt. Products (g.) | | | | | | | | | Total |
|---|---|---|---|---|---|---|---|---|---|---|---|---|---|---|---|
| | | | | | | $C_6F_6$ | $C_6F_5Cl$ | $C_2Cl_3F_3$ | $C_2ClF_3$ | $C_2HClF_3$ | $C_2HF_3$ | $C_2F_4$ | $C_2ClF_3$ | $CO_2$ | Unknown Cpds. | |
| 18 | $Fe_3O_4$, 225 | $C_6F_5Cl_2$ | 3.8 | 385 | 1½ | 2.05 | 0.43 | | | | | | | 0.04 | 0.08 | 2.60 |
| 19 | $Fe_3O_4$, 225 | $C_2Cl_3F_3$ (approx. 5% more assym. isomer) | 6.50 | 370 | 3½ | | | 0.34 | 2.20 | | | | | 0.70 | 0.25 | 3.49 |
| 20 | $Fe_3O_4$, 225 | $CHClF \cdot CClF_2$ | 5.00 | 460 | 3½ | | | | | 0.07 | 2.03 | | | 0.33 | 0.17 | 2.60 |
| 21 | $Fe_3O_4$, 225 | $C_2Cl_2F_4$ (approx. 5% assym. isomer) | 3.71 | 500 | 4½ | | | | | | | 0.21 | 0.03 | 1.34 | 0.08 | 1.66 |

| | | | | | | $C_6F_6$ | $C_6F_{10}$ | $C_6F_{12}$ | $C_2ClF_3$ | $C_6F_4H_2$ | $p$-$C_6F_4(CF_3)_2$ | $C_8F_{16}$ | | | | |
| 22 | $Fe_3O_4$, 50 | {c-$C_6F_{12}$ 51% w./w. / c-$C_6F_{10}$ 49%} | 3.00 | 460 | 3½ | 0.68 | 0.07 | 1.01 | 0.13 | 0.02 | | | | 0.37 | | 2.28 |
| 23 | $Fe_3O_4$, 50 | c-$C_6F_{10}$ | 4.30 | 460 | 2½ | 1.56 | 0.34 | | 0.16 | 0.02 | | | | 0.91 | | 2.99 |
| 24 | $Cr_2O_3$, 250 | c-$C_6F_{12}$ | 6.50 | 600 | 6 | 0.68 | | 4.35 | | | | | | 0.12 | 0.29 | 5.44 |
| 25 | $TiO_2$, 410 | 1:4 c-$C_6F_{10}(CF_3)_2$ ($C_8F_{16}$) | 7.15 | 500 | 14 | | | | | | 0.06 | 0.39 | | 2.70 | | 3.15 |

| Example | Oxide and Vol. Used (mls.) | Compound Dehalogenated | Wt. in g. | Temp., °C. | Contact Time (mins.) | Wt. Products (g.) | | | | | | | | | Total |
|---|---|---|---|---|---|---|---|---|---|---|---|---|---|---|---|
| | | | | | | p-$C_6F_4(CF_3)_2$ | 1:4 c-$C_6F_{10}$-$(CF_3)_2$ | $C_{10}F_8$ | $C_{10}F_{18}$ | $C_2F_5$ $C_6F_5$ | $CF \cdot CF_2$ $C_6F_5$ | $C_2F_5$ $C_6F_{11}$ | | $CO_2$ | Unknown Cpds. | |
| 26 | $SnO_2$, (300) | 1:4 c-$C_6F_{10}$-$(CF_3)_2$ ($C_8F_{10}$) | 5.4 | 500 | 12.8 | 0.2 | 3.3 | | | | | | | 0.9 | 0.3 | 4.7 |
| 27 | $SnO_2$, (300) | Perfluorodecalin ($C_{10}F_{18}$) | 8.3 | 500 | 15.8 | | | 1.5 | 3.6 | | | | | 1.1 | 1.1 | 7.3 |
| 28 | $Fe_3O_4$, (305) | Perfluorodecalin ($C_{10}F$)$_{18}$ | 8.6 | 400 | 14.8 | | | 2.9 | 1.0 | | | | | 0.1 | 0.5 | 4.5 |
| 29 | $Fe_3O_4$, (305) | 1:4 c-$C_6F_{10}$-$(CF_3)_2$ | 6.7 | 400 | 15.2 | 1.4 | 0.7 | | | | | | | 1.5 | 0.3 | 3.9 |
| 30 | $Fe_3O_4$, (305) | c-$C_6F_{11}$ $C_2F_5$ | 6.1 | 400 | 16.2 | | | | | 0.4 | | 1.1 | | 0.6 | 0.7 | 3.4 |
| 31 | $Cr_2O_3$, (230) | Perfluorodecalin | 4.4 | 500 | 14.0 | | 0.49 | 0.8 | 0.3 | | 0.6 | | | 1.0 | 0.8 | 2.9 |

| | | | | | | c-$C_6F_9$ | $C_6F_6$ | $C_6F_5H$ | $C_6ClF_5$ | $C_6Cl_2F_4$ | $CF \cdot CF_2$ $C_6F_5$ | $C_2F_5$ $C_6F_{11}$ | | | | |
| 32 | $Cr_2O_3$, (230) | c-$C_6Cl_3F_9$ (94%) | 3.8 | 500 | 13.3 | 0.03 | | | 0.25 | 0.12 | 0.06 | 0.21 | $C_6Cl_3F_3$ Probably c-$C_6ClF_7$ | 1.0 | 0.07 | 2.24 |

We claim:
1. A process for the preparation of a highly fluorinated organic compound containing carbon to carbon double bonds, comprising the essential step of contacting an organic compound chosen from the group consisting of (a) perfluorinated cyclic alkanes, cyclic alkenes and cyclic alkadienes containing rings of six and ten carbon atoms, and (b) perfluorinated cyclic alkanes, cyclic alkenes and cyclic alkadienes containing rings of six and ten carbon atoms to which are attached at least one or more perfluoroalkyl groups selected from the group consisting of perfluoromethyl and perfluoroethyl, with an oxide of at least one metal selected from the group consisting of tin, manganese, iron, chromium, copper, vanadium, molybdenum, tungsten, titanium, cobalt, lead, cerium, antimony, zinc and magnesium, at a temperature between 200° C. and 600° C., to remove halogen atoms from the compound.

2. A process as claimed in claim 1 in which the oxide is magnetite.

3. A process for the preparation of a perfluorinated aromatic compound comprising the essential step of contacting a compound chosen from the group consisting of cyclic alkanes, cyclic alkenes and cyclic alkadienes containing rings of six and ten carbon atoms, with an oxide of a metal of variable valence chosen from the group consisting of manganese, iron, chromium, copper, vanadium, molybdenum, tungsten, titanium, cobalt, lead, cerium, antimony, zinc and magnesium at a temperature between 200° C. and 600° C., to remove fluorine atoms from the compound.

4. A process as claimed in claim 3 in which the oxide is magnetite.

5. A process for the preparation of a highly fluorinated aromatic compound, comprising the essential step of contacting a compound from the group consisting of per (chlorofluoro) cyclic alkanes and per (chlorofluoro) cyclic alkenes containing rings of six and ten carbon atoms with an oxide of a metal of variable valence chosen from the group consisting of manganese, iron, chromium, copper, vanadium, molybdenum, tungsten, titanium, cobalt, lead, cerium, antimony, zinc and magnesium at a temperature between 200° C. and 600° C., to remove halogen atoms from the compound.

6. A process as claimed in claim 5 in which the oxide is magnetite.

7. A process for the preparation of a fluorinated aromatic compound comprising the essential step of contacting an organic compound chosen from the class consisting of perfluorocyclohexadienes and fluorocyclohexadienes containing at least one hydrogen atom attached to an olefinic-carbon atom, with an oxide of at least one metal chosen from the group consisting of manganese, iron, chromium, copper, vanadium, molybdenum, tungsten, titanium, cobalt, lead, cerium, antimony, zinc and magnesium, at a temperature of between 200° C. and 600° C., to remove fluorine atoms only from the compound.

8. A process as claimed in claim 7 in which the oxide is magnetite.

References Cited by the Examiner

UNITED STATES PATENTS

| | | | |
|---|---|---|---|
| 1,904,440 | 4/1933 | Freyermuth et al. | 252—416 |
| 2,150,270 | 3/1939 | Durrans et al. | 252—416 |
| 2,478,933 | 8/1949 | Bratton et al. | 260—653.5 |
| 2,599,631 | 6/1952 | Harmon | 260—653.5 |
| 2,695,320 | 11/1954 | Hedrich | 260—653.5 |
| 2,697,124 | 12/1954 | Mantell | 260—653.5 |
| 3,000,976 | 9/1961 | Patrick et al. | 260—650 |
| 3,004,077 | 10/1961 | Banks et al. | 260—650 |
| 3,043,889 | 7/1962 | Smith | 260—653.5 |
| 3,118,005 | 1/1964 | Pavlath | 260—653.5 |

LEON ZITVER, *Primary Examiner.*

DANIEL D. HORWITZ, *Examiner.*

K. H. JOHNSON, K. V. ROCKEY,
*Assistant Examiners.*